US012629967B2

(12) United States Patent
Fontaine et al.

(10) Patent No.: US 12,629,967 B2
(45) Date of Patent: May 19, 2026

(54) TIRE COMPRISING A PATTERN PROVIDING A HIGH CONTRAST

(71) Applicant: The Goodyear Tire & Rubber Company, Akron, OH (US)

(72) Inventors: Sebastien Willy Fontaine, Vichten (LU); Michel Jean Yves Windeshausen, Messancy (BE); Wendy Therese Frida El-Sebaly, Sankt-Vith (BE); Vincent Pierre David Bylda, Langsur (DE)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 18/064,983

(22) Filed: Dec. 13, 2022

(65) Prior Publication Data

US 2024/0190180 A1     Jun. 13, 2024

(51) Int. Cl.
B60C 13/00          (2006.01)

(52) U.S. Cl.
CPC .................................. B60C 13/001 (2013.01)

(58) Field of Classification Search
None
See application file for complete search history.

(56) References Cited

U.S. PATENT DOCUMENTS

| | | | |
|---|---|---|---|
| 2009/0218019 A1* | 9/2009 | Paturle | B29C 33/424 |
| | | | 428/88 |
| 2012/0273101 A1* | 11/2012 | Iwabuchi | B60C 5/00 |
| | | | 152/151 |
| 2014/0166177 A1* | 6/2014 | Muhlhoff | B29D 30/72 |
| | | | 152/523 |
| 2022/0219494 A1 | 7/2022 | Lee | |
| 2022/0324268 A1* | 10/2022 | Shimizu | B60C 13/02 |
| 2023/0234402 A1* | 7/2023 | Ishii | B60C 13/001 |
| 2023/0241928 A1* | 8/2023 | Iwabuchi | B60C 13/001 |
| | | | 152/523 |

FOREIGN PATENT DOCUMENTS

EP          3698989 A1     8/2020

OTHER PUBLICATIONS

European Search Report for Serial No. EP23215358 mailed Apr. 24, 2024.

* cited by examiner

*Primary Examiner* — Justin R Fischer
*Assistant Examiner* — Nicholas J Weiler
(74) *Attorney, Agent, or Firm* — Eryn Ace Fuhrer; June E. Rickey

(57)          ABSTRACT

An aspect of the present invention relates to a tire comprising a sidewall, the sidewall having a surface comprising a surface portion including a hexagonal textured base pattern repeated over the surface portion so as to form a periodic textured pattern providing a high contrast to the surface portion. The hexagonal textured base pattern comprises protrusions and recesses, the protrusions and the recesses of the repeated textured base pattern cooperating to form respective lineal features extending over at least two of the repeated hexagonal textured base patterns.

17 Claims, 5 Drawing Sheets

400

402

404

406

414

412

408 410 408 408

TIRE COMPRISING A PATTERN PROVIDING A HIGH CONTRAST

FIELD OF THE INVENTION

The present invention relates to a tire comprising a sidewall, the sidewall having a surface comprising a surface portion with a high contrast pattern.

BACKGROUND OF THE INVENTION

It is known in the art to have a tire with a sidewall surface that includes letters, numbers or symbols. Because the tire is typically made of rubber which has a black color, the letters, numbers or symbols can be difficult to see and/or read.

Furthermore, the visibility of the letters, numbers or symbols may decrease over time. This may happen e.g. in use when dust or mud covers the letters, numbers or symbols.

SUMMARY OF THE INVENTION

Thus, it is desired to enhance the visibility of the letters, numbers or symbols shown on the sidewall, and in addition, such visibility should not decrease in use over time. This, as well as other advantages which will become apparent in the following, is met by the different aspects of the present invention.

A first aspect of the present invention relates to a tire comprising a sidewall, the sidewall having a surface comprising a surface portion including a hexagonal textured base pattern repeated over the surface portion so as to form a periodic textured pattern providing a high contrast to the surface portion. The hexagonal textured base pattern comprises protrusions and recesses, the protrusions and the recesses of the repeated textured base pattern cooperating to form respective lineal features extending over at least two of the repeated hexagonal textured base patterns.

In an embodiment, a difference of height between the (highest of the) protrusions and the (lowest of the) recesses is comprised in the range from 0.1 to 0.6 mm, preferably in the range from 0.2 to 0.5 mm. In other words, the hexagonal textured base pattern comprises a highest point and a lowest point, a difference of height between the highest point and a lowest point is comprised in the range from 0.1 to 0.6 mm, preferably in the range from 0.2 to 0.5 mm.

In an embodiment, the hexagonal textured base pattern comprises inclined surfaces joining the protrusions and the recesses.

In an embodiment, the inclined surfaces have a slope comprised in the range from 2 to 6 (mm/mm), preferably in the range from 3 to 5 (mm/mm).

In an embodiment, the hexagonal textured base pattern comprises substantially vertical surfaces joining the protrusions and the recesses. By substantially vertical, it is meant that the surfaces joining the protrusions and the recesses do not deviate from more than 5°, preferably 4°, even more preferably 3°, most preferably 2°, from the normal to the surface of sidewall.

In an embodiment, the lineal features comprise at least one of lines and curves.

In an embodiment, the lineal features comprise (or consist of) lines, wherein at least two of the lines are not mutually parallel.

In an embodiment, at least one of the protrusions and the recesses forms a plateau having a thickness comprised in the range from 0.1 to 0.5 mm, preferably in the range from 0.2 to 0.4 mm.

In an embodiment, the sidewall is the exterior sidewall of the tire. In another embodiment, the sidewall is the interior sidewall of the tire. In a further embodiment, both exterior and interior sidewalls of the tire comprise the surface portion as described herein, so that both exterior and interior sidewalls have a portion thereof having a high contrast surface portion.

In an embodiment, the hexagonal textured base pattern has a surface roughness comprised in the range from 2 μm to 20 μm, preferably in the range from 5 μm to 16 μm.

A second aspect of the present invention relates to a tire comprising a sidewall, the sidewall having a surface comprising a surface portion including a hexagonal textured base pattern repeated over the surface portion so as to form a periodic textured pattern providing a high contrast to the surface portion. The hexagonal textured base pattern comprises protruding features and recessed features, the protruding features and recessed features intersecting so as to form at least two non-parallel edges.

In an embodiment, the hexagonal textured base pattern comprises a highest point and a lowest point, wherein a difference of height between the highest point and the lowest point is comprised in the range from 0.1 to 0.6 mm, preferably in the range from 0.2 to 0.5 mm.

In an embodiment, the protruding features and the recessed features comprise inclined surfaces, preferably inclined planes.

In an embodiment, the inclined surfaces (preferably planes) have a slope comprised in the range from 2 to 6 (mm/mm), preferably in the range from 3 to 5 (mm/mm).

In an embodiment, the hexagonal textured base pattern comprises three inclined surfaces (preferably planes) intersecting at an intersection point. Alternatively or additionally, the hexagonal textured base pattern may comprise four inclined surfaces (preferably planes) intersecting at an intersection point.

In an embodiment, the at least two non-parallel edges comprise at least one of lines and curves.

In an embodiment, the sidewall is the exterior sidewall of the tire. In another embodiment, the sidewall is the interior sidewall of the tire. In a further embodiment, both exterior and interior sidewalls of the tire comprise the surface portion as described herein, so that both exterior and interior sidewalls have a portion thereof having a high contrast surface portion.

In an embodiment, the hexagonal textured base pattern has a surface roughness comprised in the range from 2 μm to 20 μm, preferably in the range from 5 μm to 16 μm.

A third aspect of the present invention relates to a tire comprising a sidewall, the sidewall having a surface comprising a surface portion comprising a three-dimensional tessellation. The three-dimensional tessellation comprises a plurality of inclined planes (or surfaces) intersecting so as to form edges, at least two of the edges being non-parallel.

In an embodiment, three of the plurality of inclined planes (or surfaces) further intersect at an intersection point. Alternatively or additionally, four of the plurality of inclined planes (or surfaces) may intersect at an intersection point.

In an embodiment, the three-dimensional tessellation comprises a highest point and a lowest point, wherein a difference of height between the highest point and the lowest point is comprised in the range from 0.1 to 0.6 mm, preferably in the range from 0.2 to 0.5 mm.

In an embodiment, the three-dimensional tessellation has a surface roughness comprised in the range from 2 μm to 20 μm, preferably in the range from 5 μm to 16 μm.

Any combination of the different aspects disclosed herein and their related embodiments is also contemplated.

In all the embodiments and aspects of the present in invention, the tire may be a rubber tire. The textured patterns and three-dimensional tessellation may be produced by molding, with a mold comprising the texture or tessellation negative, and/or by laser etching the molded rubber.

Definitions

As used herein, the term "rubber" is intended to include both natural rubber compositions and synthetic rubber compositions. Specific examples of rubbers include neoprene (polychloroprene), polybutadiene (e.g., cis-1,4-polybutadiene), polyisoprene (e.g., cis-1,4-polyisoprene), butyl rubber, halobutyl rubber (such as, e.g., chlorobutyl rubber or bromobutyl rubber), styrene/isoprene/butadiene rubber, copolymers of 1,3-butadiene or isoprene with monomers such as, e.g., styrene, acrylonitrile and methyl methacrylate. Other types of rubber include carboxylated rubber, silicon-coupled rubber, or tin-coupled star-branched polymers. Rubber may include (or consist of) green rubber.

The term "sidewall" of a tire designates the axially outer parts of a tire that provide protection for the carcass ply and withstand flexing and weathering.

The term "hexagonal textured base pattern" designates a textured pattern defined within a hexagon base, the hexagon base having six straight sides forming a closed geometrical shape. The hexagon may be regular or may not be regular. In case of a regular hexagon, all the sides have the same length.

Two distinct lines or curves l and m (in three-dimensional space) are parallel if and only if the distance from a point P on line m to the nearest point on line l is independent of the location of P on line m.

In the present document, the verb "to comprise" and the expression "to be comprised of" are used as open transitional phrases meaning "to include" or "to consist at least of". Unless otherwise implied by context, the use of singular word form is intended to encompass the plural, except when the cardinal number "one" is used: "one" herein means "exactly one". Ordinal numbers ("first", "second", etc.) are used herein to differentiate between different instances of a generic object; no particular order, importance or hierarchy is intended to be implied by the use of these expressions. Furthermore, when plural instances of an object are referred to by ordinal numbers, this does not necessarily mean that no other instances of that object are present (unless this follows clearly from context). When reference is made to "an embodiment", "one embodiment", "embodiments", etc., this means that these embodiments may be combined with one another. Furthermore, the features of those embodiments can be used in the combination explicitly presented but also that the features can be combined across embodiments without departing from the invention, unless it follows from context that features cannot be combined.

BRIEF DESCRIPTION OF THE DRAWINGS

The invention will be described by way of example and with reference to the accompanying drawings in which.

Figure 1:
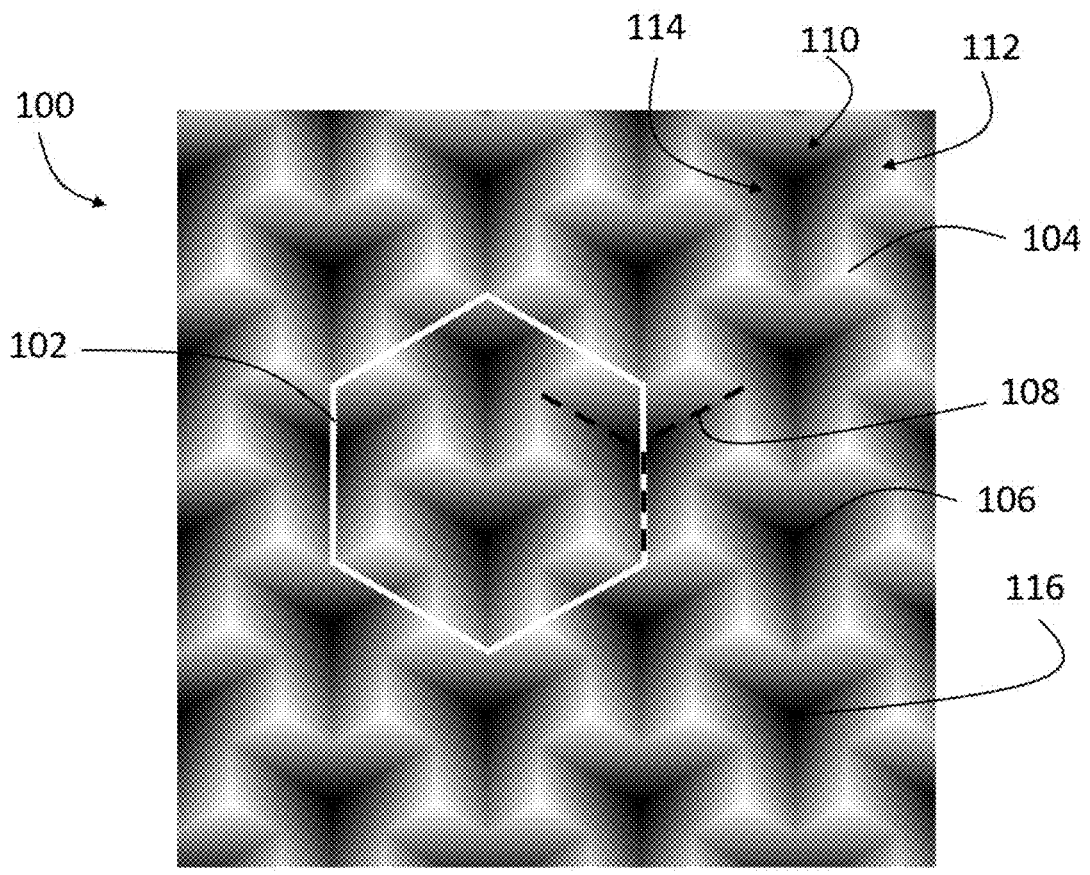
FIG. 1 shows a height map of a high contrast surface portion of a tire according to an embodiment of the present invention.

The reader's attention is drawn to the fact that the drawings are not to scale. Furthermore, for the sake of clarity, proportions between height, length and/or width may not have been represented correctly.

DETAILED DESCRIPTION OF THE INVENTION

The various embodiments described herein relate to a tire comprising a sidewall, the sidewall having a surface comprising a surface portion. The surface portion has a high contrast.

The surface portion may include a hexagonal textured base pattern repeated over the surface portion so as to form a periodic textured pattern. The periodic textured pattern provides the surface portion with high contrast. The hexagonal textured base pattern may comprise protrusions and recesses, the protrusions and the recesses of the repeated textured base pattern cooperating to form respective lineal features extending over at least two of the repeated hexagonal textured base patterns.

Alternatively or additionally, the hexagonal textured base pattern may comprise protruding features and recessed features, the protruding features and recessed features intersecting so as to form at least two non-parallel edges.

The repeated textured base patterns may pave the whole surface portion, i.e. they are arranged side-by-side, without gaps.

Alternatively or additionally, the surface portion may comprise a three-dimensional tessellation providing a high contrast to the surface portion, the three-dimensional tessellation comprising a plurality of inclined planes intersecting so as to form edges, at least two of the edges being non-parallel.

In an embodiment, the sidewall is the exterior sidewall of the tire. In another embodiment, the sidewall is the interior sidewall of the tire. In a further embodiment, both exterior and interior sidewalls of the tire comprising the surface portion as described herein, so that both exterior and interior sidewalls have a portion thereof having a high contrast.

The tire may be a rubber tire. The textured patterns and/or the three-dimensional tessellation may be produced by molding, with mold comprising the negative of the texture and/or tessellation, and/or by laser etching the molded rubber itself.

In the following, several particularly advantageous structures for the surface portion are discussed. Said structures have been found to be particularly advantageous in particular for enhancing the visibility of letters, numbers or symbols defined by the surface portion. Also, it has been discovered that said structures particularly enhance the hydrophobic nature of the tire thereby reducing the possibility of the letters, numbers or symbols to become less visible due to presence of mud or the like, e.g. during use.

In an embodiment, the surface portion has a surface roughness comprised in the range from 2 $\mu$m to 20 $\mu$m, preferably in the range from 5 $\mu$m to 16 $\mu$m.

In an embodiment, the surface portion comprises a highest point and a lowest point, wherein a difference of height between the highest point and the lowest point is comprised in the range from 0.1 to 0.6 mm, preferably in the range from 0.2 to 0.5 mm.

FIG. 1 shows a height map of a high contrast surface portion of a tire according to an embodiment of the present invention. In FIG. 1, a periodic textured pattern 100 is shown. The periodic textured pattern 100 comprises multiple hexagonal textured base patterns 102 (depicted in white in FIG. 1) repeated over the surface portion. The hexagonal textured base pattern comprises protrusions 106 and recesses 104. The protrusions 106 and recesses 104 within the hexagonal textured base pattern 102 cooperate with the protrusions 106 and recesses 104 located within a neighboring hexagonal textured base pattern 102 to form lineal features 108 extending over the two hexagonal textured base patterns 102. In the present embodiment, the lineal features are (at least two) lines which are not mutually parallel. In other embodiments, lineal features may be (at least two) curves. Of course, in embodiments, lines and curves may be used.

In more details, the pattern 100 comprises interlocked tripods made of three inclined surfaces 110, 112, 114 intersecting at an intersection point 116 (shown in another tripod for the sake of clarity of the figure). The minimal distance between two parallel lineal features of the textured pattern 100 is greater than 0.55 mm, preferably greater than 0.6 mm. The maximal distance between two parallel lineal features of the textured pattern 100 is preferably below 1 mm.

Figure 2:
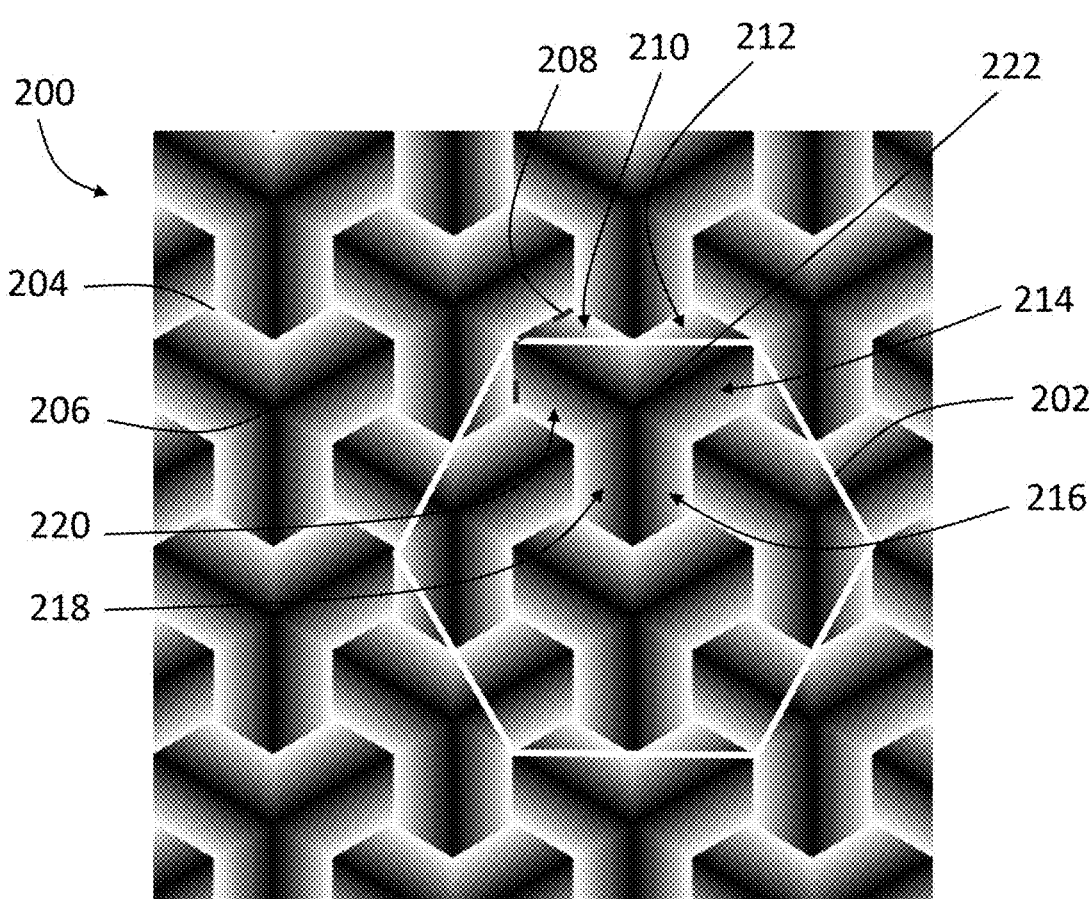
FIG. 2 shows a height map of a high contrast surface portion of a tire according to an embodiment of the present invention.

FIG. 2 shows a height map of a high contrast surface portion of a tire according to an embodiment of the present invention. In FIG. 2, a periodic textured pattern 200 is shown. The periodic textured pattern 200 comprises multiple hexagonal textured base patterns 202 (depicted in white in FIG. 2) repeated over the surface portion. The hexagonal textured base pattern 202 comprises protruding features 206 and recessed features 204, the protruding features 206 and the recessed features 204 intersecting so as to form at least two non-parallel edges 208.

In more details, the pattern 200 is formed by interlocked tripods made of six inclined surfaces 210, 212, 214, 216, 218, 220 intersecting at an intersection point 222. The inclined surfaces may be paired two by two, the intersection of such pairs being a line, thereby forming three lines intersecting at the intersection point 222. The minimal distance between two parallel lines of the pattern 200 is greater than 0.55 mm, preferably greater than 0.6 mm. The maximal distance between two parallel lines of the pattern 200 is preferably below 1 mm.

Figure 3:
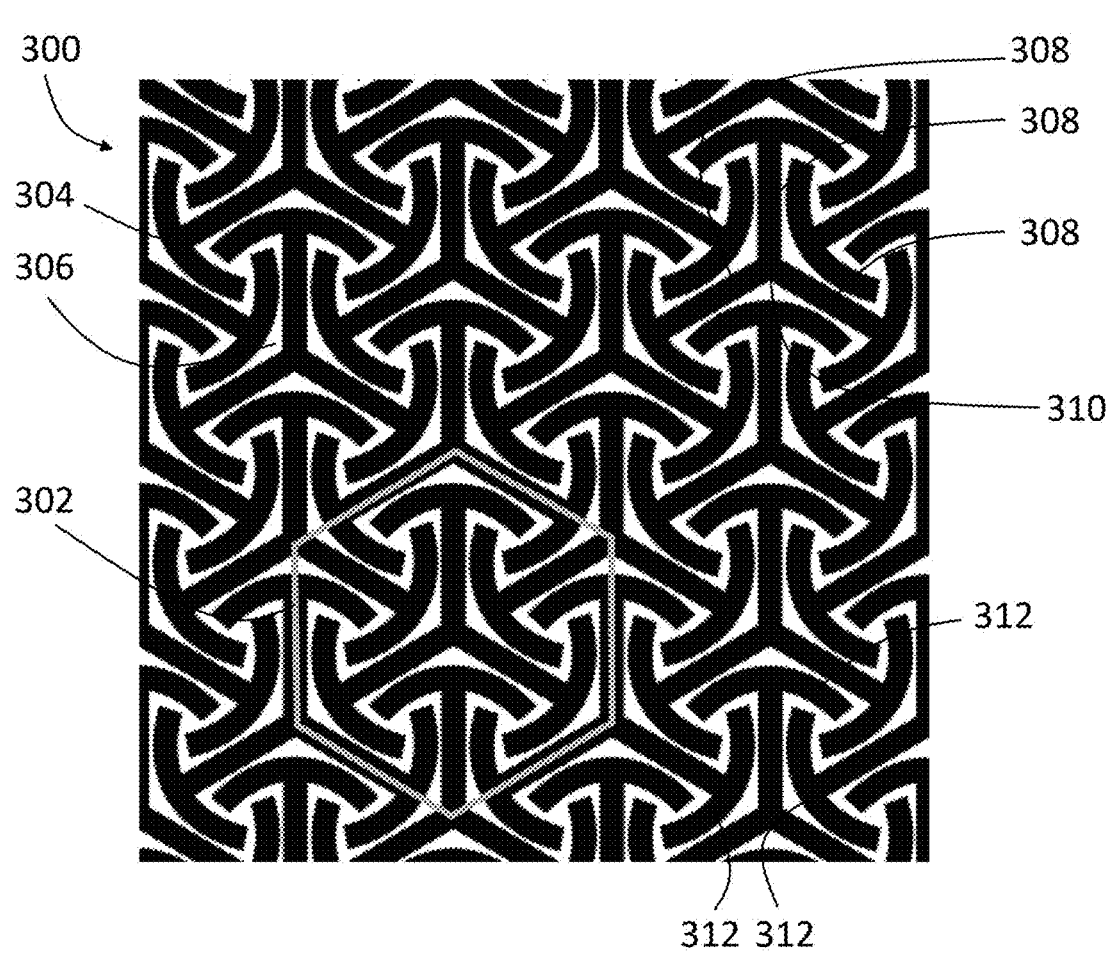
FIG. 3 shows a height map of a high contrast surface portion of a tire according to an embodiment of the present invention.

FIG. 3 shows a height map of a high contrast surface portion of a tire according to an embodiment of the present invention. In FIG. 3, a periodic textured pattern 300 is shown. The periodic textured pattern 300 comprises multiple hexagonal textured base patterns 302 repeated over the surface portion. The hexagonal textured base pattern comprises protrusions 304 and recesses 306. The protrusions 304 and the recesses 306 each form a plateau (i.e. each of the protrusions and recesses have a constant height). In the present embodiment, the protrusions 304 form lines and curves. The thickness of the lines and curves is comprised in the range from 0.1 to 0.5 mm, preferably in the range from 0.2 to 0.4 mm. Of course, in another embodiment, the protrusions 304 and the recesses 306 may be interchanged.

In more details, the pattern 300 is formed by interlocked shapes, the shapes comprising protrusions 304 including three lines 308 joining together at one end 310, and including a circle segment 312 at the other end of each of the lines 308. The circle segments 312 preferably have the same radius of curvature. The circle segments 312 of a shape interlock circle segments of neighboring shapes. The minimal distance between two parallel lines of the interlocked shapes is greater than 0.55 mm, preferably greater than 0.6 mm. The maximal distance between two parallel lines of the interlocked shapes is preferably below 1 mm. The interlocked shapes are separated by the recesses 306.

Figure 4:
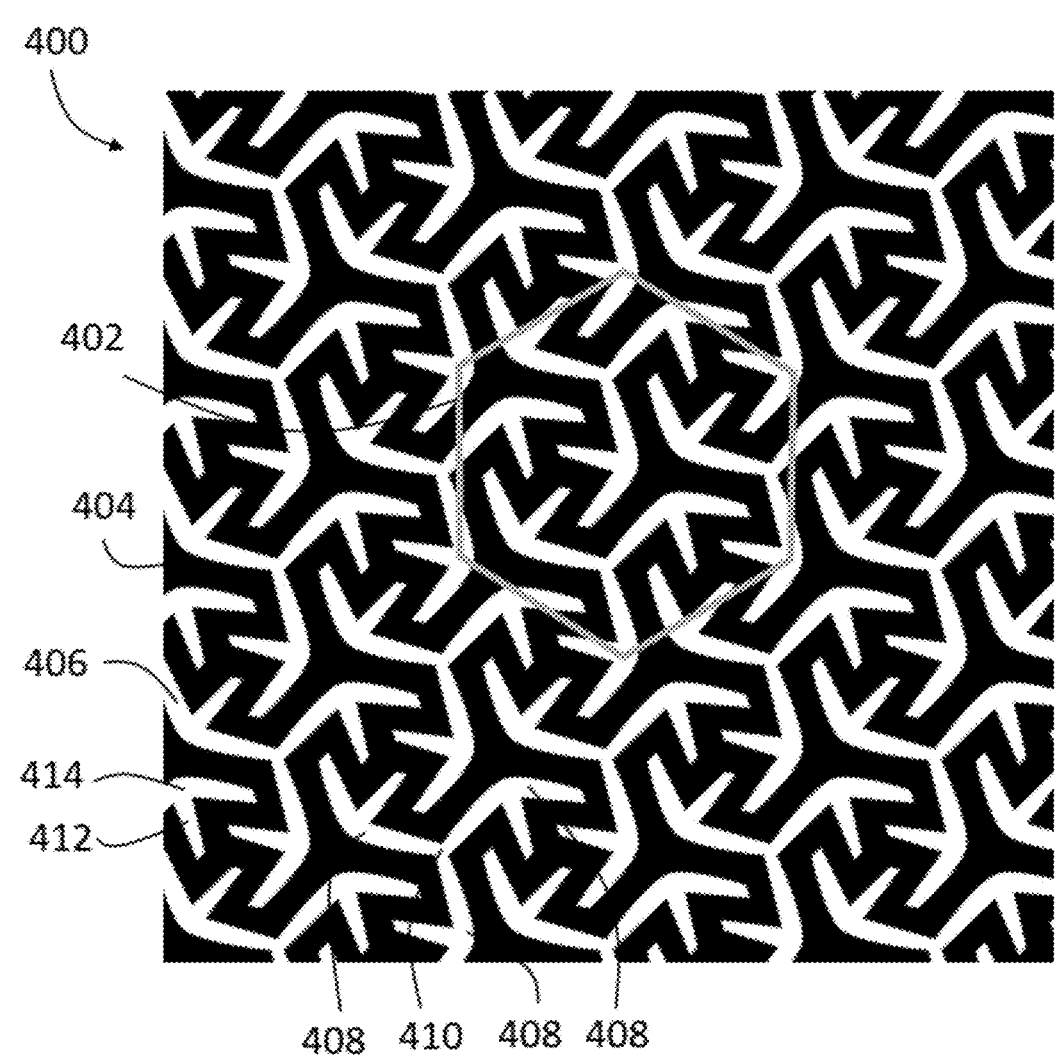
FIG. 4 shows a height map of a high contrast surface portion of a tire according to an embodiment of the present invention.

FIG. 4 shows a height map of a high contrast surface portion of a tire according to an embodiment of the present invention. In FIG. 4, a periodic textured pattern 400 is shown. The periodic textured pattern 400 comprises multiple hexagonal textured base patterns 402 repeated over the surface portion. The hexagonal textured base pattern 402 comprises protrusions 404 and recesses 406. The protrusions 404 and the recesses 406 each form a plateau (i.e. each of the protrusions and recesses have a constant height). In the present embodiment, the recesses 406 form lines and curves. The thickness of the lines and curves is comprised in the range from 0.1 to 0.5 mm, preferably in the range from 0.2 to 0.4 mm. Of course, in another embodiment, the protrusions 304 and the recesses 306 may be interchanged.

In more details, the pattern 400 is formed by interlocked shapes, the shapes comprising recesses 406 being generally formed as chevrons 408 joining each other at one end thereof. In the present embodiment, the shapes comprise three chevrons 408 joining each other at one end thereof. Of course, in other embodiments, four chevrons 408 or more may be used. The chevrons 408 may comprise a projection 412 at their apex 414, the projection projecting downwards (i.e. towards the inside of the chevron). The chevrons 408 of a shape interlock with one or more chevrons 408 of one or more neighboring shapes. The minimal distance between two parallel lines of the interlocked shapes is greater than 0.55 mm, preferably greater than 0.6 mm. The maximal distance between two parallel lines is preferably below 1 mm.

Figure 5:
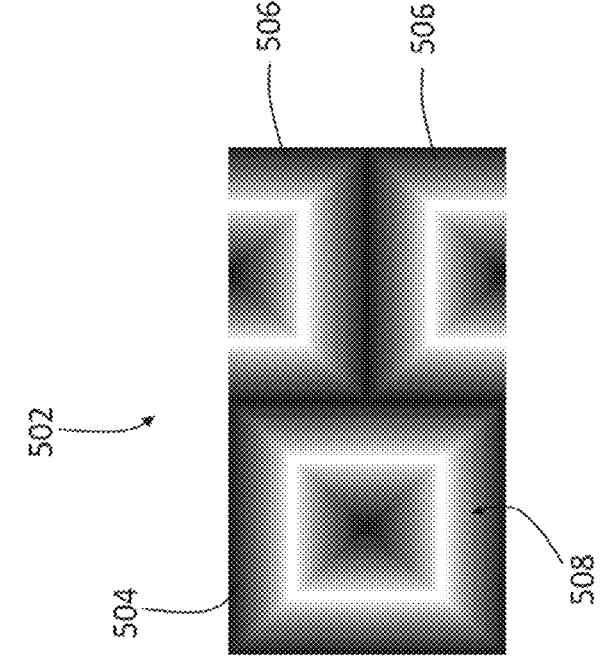
FIG. 5 shows a height map of a high contrast surface portion of a tire according to an embodiment of the present invention.
Figure 5:
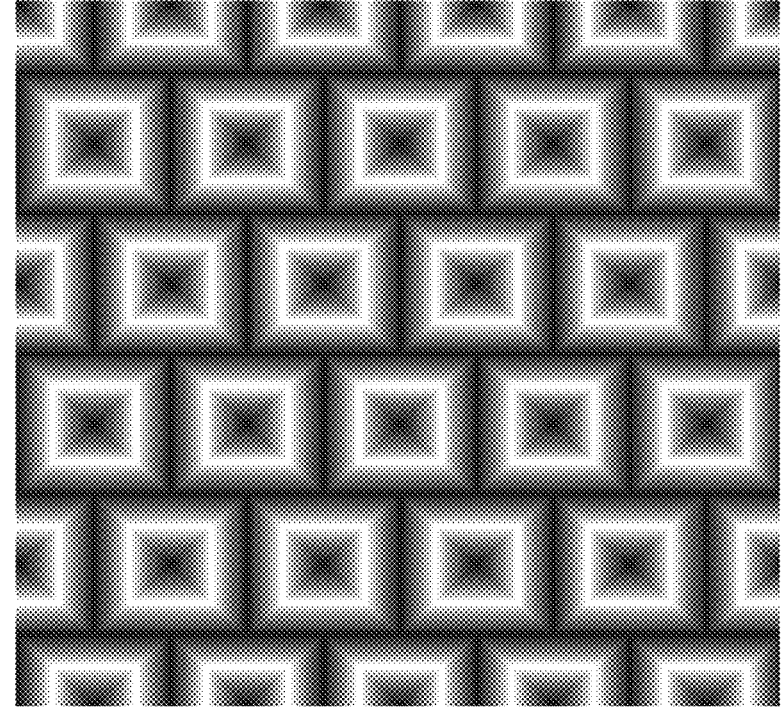

FIG. 5 shows a height map of a high contrast surface portion of a tire according to an embodiment of the present invention. On the left side of FIG. 5, a three-dimensional tessellation 500 of the surface portion is shown. On the right side of FIG. 5, the base structure 502 used for tessellating the surface portion is shown. The tessellation 500 comprises three-dimensional objects 504 comprising plurality of inclined planes 508. Each of the three-dimensional objects 504 comprises 8 inclined planes 508. Part (i.e. four) of the inclined planes 508 form a pyramid, the other part (i.e. four) intersect the base of the pyramid and forming walls around the pyramid. At least two of the intersections forming edges are non-parallel.

The base structure 502 comprises a three-dimensional object 504 such as described hereinabove as well as two translated halves 506 of such an object, side by side. In other words, the three-dimensional tessellation 500 may be seen as a waffle mold with a walled unit cells having a pyramidal protrusion therein, wherein every other line (or column) of the walled unit cell is translated from half of the size of the unit cell in that direction.

Each embodiment disclosed herein may be combined, in particular it may be particularly advantageous to combine the different embodiments as disclosed in FIGS. 1 through 5 to provide multiple degrees of contrast to the surface portion.

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

What is claimed is:

1. A tire comprising a sidewall, the sidewall having a surface comprising a surface portion including textured base pattern repeated over the surface portion so as to form a periodic textured pattern providing a high contrast to the surface portion, the textured base pattern comprising protrusions and recesses, the protrusions and the recesses of the repeated textured base pattern cooperating to form a first, second and third inclined surface joined together at an intersection forming a first tripod, and a second tripod formed of a first, second and third inclined surface joined together at an intersection, wherein the first inclined surface of the first tripod is aligned with the first inclined surface of a second tripod forming a first row which extends in a first direction wherein a distance between parallel lines of said inclined surfaces is less than 1 mm.

2. The tire according to claim 1, wherein a difference of height between the protrusions and the recesses is comprised in the range from 0.1 to 0.6 mm.

3. The tire according to claim 1, wherein the first tripod is recessed from the outer surface of the sidewall.

4. The tire according to claim 1, wherein the inclined surfaces have a slope comprised in the range from 2 to 6.

5. The tire according to claim 1, wherein the textured base pattern further includes a third tripod formed of a first, second and third inclined surface joined together at an intersection, wherein the second surface of the first tripod is aligned with the second surface of the third tripod forming a second row extending in a second direction.

6. The tire according to claim 5, wherein the textured base pattern further includes a fourth tripod formed by a first, second and third inclined surface joined together at an intersection, wherein a first inclined surface of the third tripod is aligned with the first inclined surface of the fourth tripod forming a third row.

7. The tire according to claim 6, wherein the first and third rows are parallel.

8. The tire according to claim 1, wherein the intersections of the first and second tripod are aligned in the first direction.

9. A tire comprising a sidewall, the sidewall having a surface comprising a surface portion including textured base pattern repeated over the surface portion so as to form a periodic textured pattern providing a high contrast to the surface portion, the textured base pattern comprising protruding features and recessed features, the protruding features and recessed features intersecting so as to form at least three non-parallel lines, wherein the three nonparallel lines are joined together at an intersection to form a tripod, wherein each non-parallel line has a curved segment on an end of the non-parallel line, wherein ends of the curved segment do not intersect any other lines in the textured pattern.

10. The tire according to claim 9 wherein the textured base pattern comprises a highest point and a lowest point, wherein a difference of height between the highest point and the lowest point is comprised in the range from 0.1 to 0.6 mm.

11. The tire according to claim 9, wherein each line is formed from two intersecting inclined surfaces.

12. The tire according to claim 11, wherein the inclined surfaces have a slope comprised in the range from 2 to 6.

13. The tire according to claim 9, wherein the tripod is a protrusion from the sidewall of the tire.

14. The tire according to claim 9, wherein the at least three non-parallel lines comprise at least one of lines and curves.

15. The tire according to claim 9, wherein the sidewall is the exterior sidewall of the tire.

16. A tire comprising a sidewall, the sidewall having a surface comprising a surface portion comprising a three-dimensional tessellation providing a high contrast to the surface portion, the three-dimensional tessellation comprising a plurality of inclined planes intersecting so as to form at least three edges, wherein at least two of the edges are non-parallel, wherein each edge is in the shape of a chevron having an end, wherein each end of the chevrons are joined together at an intersection wherein a distance between parallel edges of the three-dimensional tessellation are less than 1 mm.

17. The tire according to claim 16, wherein at least one chevron has a projection extending from an apex.

* * * * *